(12) United States Patent
Morr

(10) Patent No.: US 12,731,970 B2
(45) Date of Patent: Sep. 8, 2026

(54) ADJUSTABLE SEALED ELECTRICAL BOX

(71) Applicant: ALLIED MOULDED PRODUCTS, INC., Bryan, OH (US)

(72) Inventor: Dustin Morr, Edon, OH (US)

(73) Assignee: ALLIED MOULDED PRODUCTS, INC., Bryan, OH (US)

( * ) Notice: Subject to any disclaimer, the term of this patent is extended or adjusted under 35 U.S.C. 154(b) by 184 days.

(21) Appl. No.: 18/675,513

(22) Filed: May 28, 2024

(65) Prior Publication Data

US 2024/0396317 A1 Nov. 28, 2024

Related U.S. Application Data

(60) Provisional application No. 63/504,290, filed on May 25, 2023.

(51) Int. Cl.
*H02G 3/12* (2006.01)
*H02G 3/08* (2006.01)

(52) U.S. Cl.
CPC ............. *H02G 3/126* (2013.01); *H02G 3/088* (2013.01); *H02G 3/085* (2013.01)

(58) Field of Classification Search
CPC ...................................................... H02G 3/126
USPC ........................................................... 174/58
See application file for complete search history.

(56) References Cited

U.S. PATENT DOCUMENTS

| | | | | |
|---|---|---|---|---|
| 8,076,578 | B1 | 12/2011 | Gretz | |
| 12,081,005 | B2 * | 9/2024 | Coscarella | H02G 3/14 |
| 2005/0051546 | A1 * | 3/2005 | Dinh | H02G 3/126 220/3.7 |
| 2012/0220164 | A1 * | 8/2012 | Flynn | H01R 24/22 439/535 |
| 2012/0279746 | A1 * | 11/2012 | Gagne | H02G 3/126 174/50.51 |
| 2020/0220341 | A1 | 7/2020 | Hughey et al. | |
| 2021/0167588 | A1 * | 6/2021 | Walk | H02G 3/123 |

* cited by examiner

*Primary Examiner* — Stanley Tso
(74) *Attorney, Agent, or Firm* — Shumaker, Loop & Kendrick, LLP; James D. Miller

(57) ABSTRACT

An electrical box assembly for installation in a wall structure having a support member includes an electrical box having a front face with a front opening leading into an interior of the electrical box, a bracket slidably coupled to an outer circumferential surface of the electrical box with the bracket configured to be securely coupled to the support member of the wall structure, a sealing element disposed on the electrical box at or adjacent the front face thereof with the sealing element configured to form a seal with an inner facing surface of the wall structure, and an adjustment mechanism configured to selectively adjust a position of the electrical box relative to the bracket with respect to an axial direction of the electrical box to adjust a sealing force present between the sealing element and the wall structure.

20 Claims, 10 Drawing Sheets

12
32
28
26b
36
26
26a
8
5
32b
36
32a
7
7
45
42
52
10
50
30
16
51
42
45
26a
36
26
26b
40
4
32
8
32a
36
32b
3

50
58
56
54
52
51

32
30
6
5
45
12
40
7
7
10
8
4

140,
140b
141
143
7
8
8
7
4
50
145
145
105
140,
140a
40

140,
140b
141
4
145
140,
140b
50
141
143
145
143
142
146
40
142
10
105

ADJUSTABLE SEALED ELECTRICAL BOX

CROSS-REFERENCE TO RELATED APPLICATION

This patent application claims priority to U.S. Provisional Patent Application Ser. No. 63/504,290, filed on May 25, 2023, the entire disclosure of which is hereby incorporated herein by reference.

FIELD OF THE INVENTION

The present invention relates to an electrical box assembly, and more particularly, to an electrical box assembly having an adjustable mounting system and a feature for forming a vapor barrier to prevent a flow of air past a front opening of an enclosure of the electrical box assembly.

BACKGROUND OF THE INVENTION

Typically, an electrical box is used to support and contain electrical devices and wiring in a centralized space. The electrical box protects the wiring and electrical devices contained therein from extrinsic conditions such rain, snow, and fire, for example. A cover plate can be provided to further protect the wiring and electrical devices and militate against accidental contact with the wiring and devices. The electrical box is typically connected to a joist, a stud, or another structural component of a building acting as a mounting structure or surface. The electrical box also typically includes an open end or face opening towards an interior of a building, room, or other structure, which positions the open end or face adjacent an outermost layer of the structure through which the electrical box extends.

Prior art electrical boxes include mounting systems with fastening devices that facilitate a connection to a mounting structure. A common goal in installing electrical outlet boxes on interior walls is to install the front face of the box substantially flush with a wall surface. Conventional outlet boxes are typically fastened to a wall stud before the drywall is applied to the studs. As drywall is supplied in various thicknesses, it is difficult for the installer of the outlet boxes to position them correctly with respect to the eventual wall surface. If a repositioning of the electrical box is desired, the fastening devices must be completely removed from the mounting structure. The electrical box is then repositioned and the fastening devices re-fastened to the mounting structure. This typically requires the formation of additional apertures in the mounting structure. Further, the repositioning process can be time consuming.

To provide a means of adjusting the face of the outlet box substantially flush with the wall surface, adjustable outlet boxes have been proposed. The adjustable outlet boxes typically include a bracket and a mechanism for adjusting the face of the outlet box with respect to the wall surface.

Although several adjustable outlet boxes have been proposed, there is still a need for an adjustable outlet box that can be securely fastened to a stud. Additionally, brackets suggested by the prior art are typically of complex design, which increases the production costs thereof.

What is needed therefore is an adjustable electrical outlet box that is of simple design to enable it to be easily manufactured. Additionally, the adjustable outlet box should be capable of being securely fastened to a stud such that the box will not become loose from the supporting stud. These and other advantages can be realized with the adjustable outlet box proposed herein in the present invention.

Another concern presented whenever an electrical box is utilized is that a vapor barrier, which is provided in a wall structure to prevent outside air from entering into a building, is penetrated by the electrical box. One vapor barrier that is utilized in external walls and ceilings of the building is a continuous plastic sheet, either between the studs and siding, or between the studs and a wall board. The plastic sheet forms the vapor barrier preventing air from leaking into, or out of the building. However, the electrical box requires the penetration of the vapor barrier in order to install the electrical box.

One electrical box utilizes a rigid flange surrounding the electrical box to extend outwardly from the box in all directions and includes a first surface and a second surface that are generally parallel with a surface of the wall to abut the vapor barrier. The rigid flange has typically not been provided on metal boxes or boxes produced from other materials. However, others have provided a molded PVC box having the rigid flange integrally molded with the sides and closed end of the electrical box.

Inasmuch as the walls and the sides of the electrical box are required to be substantially rigid, any integrally molded flange has the same rigidity as the sides of the box. The rigidity of the flange creates several issues for installers of the box. Imperfections in the studs and other components of the wall require accommodation of differences in tolerance measurements and alignment. While a flexible vapor barrier easily accommodates the imperfections, the rigid flange extending outwardly from the electrical box does not. Thus, the rigid flange may cause ripples or other imperfections in the wall and the exterior siding. To alleviate the ripples, shaving or adjusting a position of the studs is required to maintain a desired appearance of both the siding and interior surfaces of the walls.

Thus, it is also highly desirable to provide a new and improved electrical box that allows the electrical box to be installed in a wall construction while maintaining an integrity of the vapor barrier of the wall construction. It is also desirable to provide a new and improved electrical box that can be mounted in a manner to accommodate inconsistencies in dimensions, alignment, and the like, allowing for fast and efficient construction and maintain planar interior wall surfaces and desired siding construction.

SUMMARY OF THE INVENTION

Consistent and consonant with the present invention, an electrical box assembly including a mounting system which facilitates a repositioning of the electrical box while also establishing a vapor barrier around the electrical box has surprisingly been discovered.

In one embodiment, electrical box assembly for installation in a wall structure having a support member comprises an electrical box having a front face with a front opening formed therein with the front opening leading into an interior of the electrical box, a bracket slidably coupled to an outer circumferential surface of the electrical box with the bracket configured to be securely coupled to the support member of the wall structure, a sealing element disposed on the electrical box at or adjacent the front face thereof with the sealing element configured to form a seal with an inner facing surface of the wall structure when the sealing element is engaged therewith, and an adjustment mechanism configured to selectively adjust a position of the electrical box relative to the bracket with respect to an axial direction of the electrical box. A scaling force present at the seal between the sealing element and the inner facing surface of the wall structure is adjustable via the adjustment of the position of the electrical box relative to the bracket with respect to the axial direction of the electrical box.

BRIEF DESCRIPTION OF THE DRAWINGS

The above advantages of the invention will become readily apparent to those skilled in the art from reading the following detailed description of an embodiment of the invention in the light of the accompanying drawings, in which.

DETAILED DESCRIPTION OF THE PREFERRED EMBODIMENT

Figures 1, 2, 3:
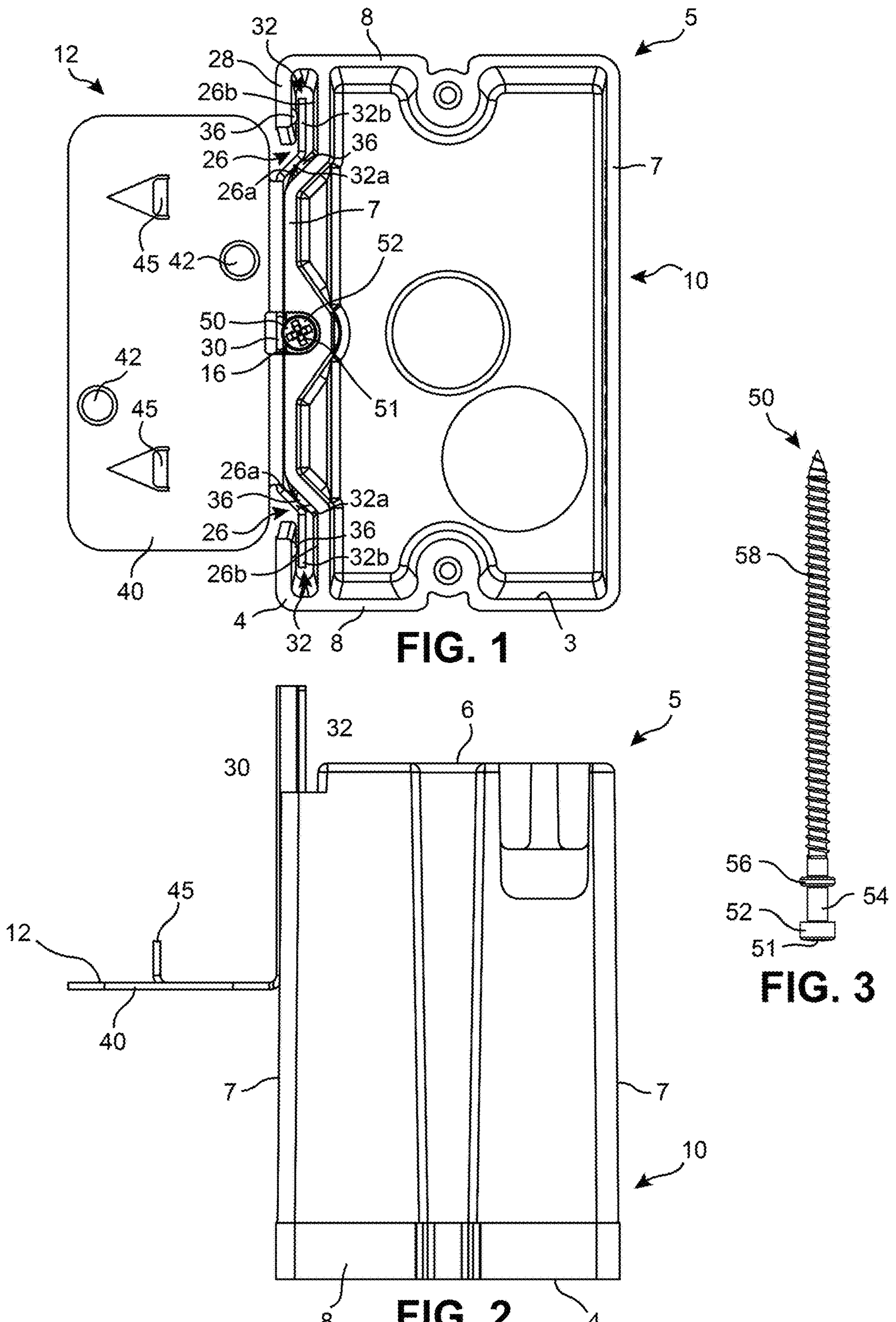
FIG. 1 is a front elevational view of an adjustable electrical box assembly according to an embodiment of the present invention.
FIG. 2 is a top plan view of the electrical box assembly of FIG. 1.
FIG. 3 is a top plan view showing a threaded fastener of the electrical box assembly of FIGS. 1 and 2 in isolation.
Figures 4, 5:
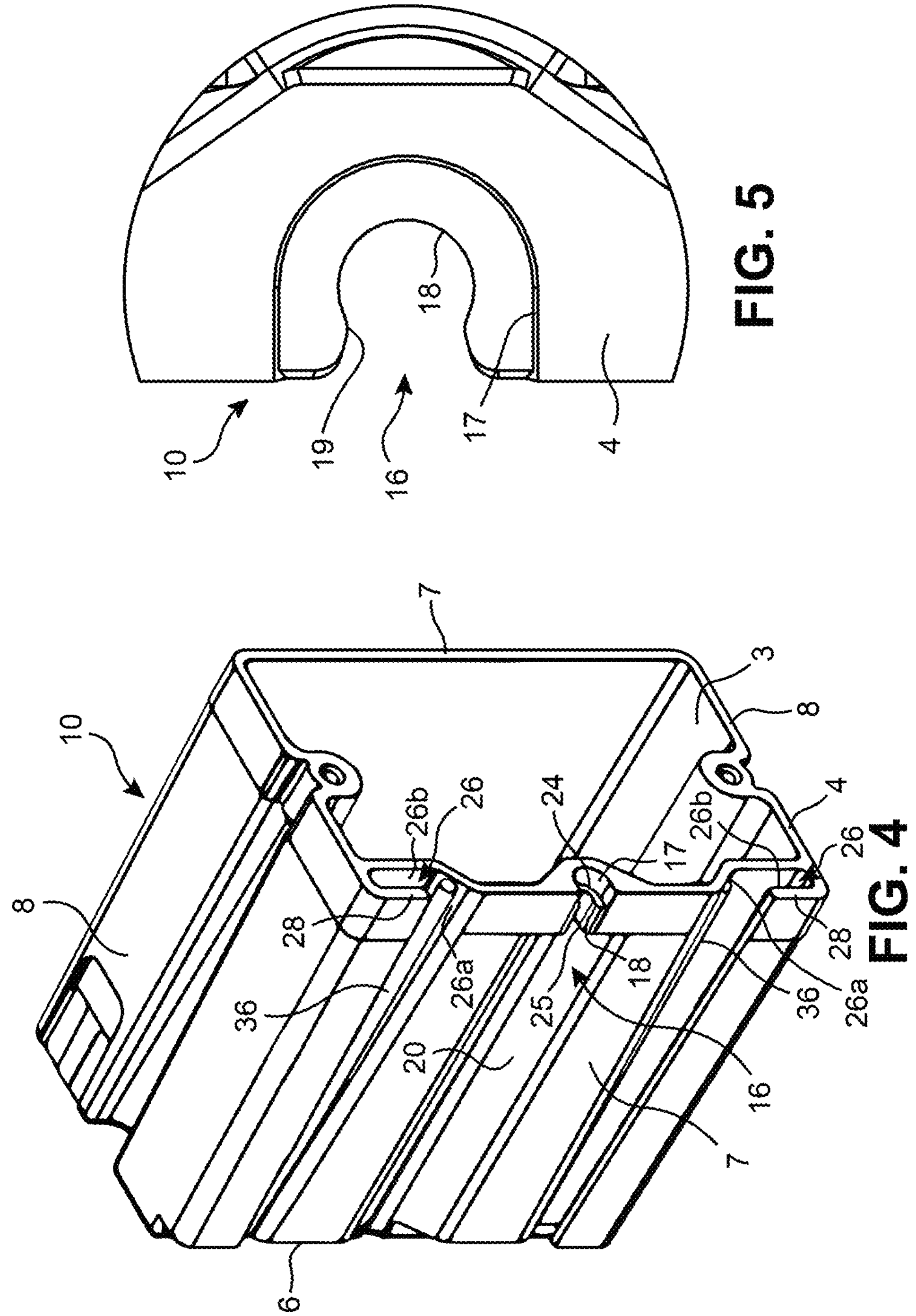
FIG. 4 is a front perspective view showing an electrical box of the electrical box assembly of FIGS. 1 and 2 in isolation.
FIG. 5 is a fragmentary front elevational view of a portion of the electrical box of FIG. 4 showing a channel formed in the electrical box.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-9 illustrate an electrical box assembly 5 according to an embodiment of the present invention. The electrical box assembly 5 includes an electrical box 10, a bracket 12 slidably engaging the electrical box 10, and a threaded fastener 50 acting as an adjusting mechanism configured to operably engage the bracket 12 and to adjust a position of the bracket 12 relative to the electrical box 10. The electrical box assembly 5 is adjustable to accommodate varying wall thicknesses, as may occur when a wall structure housing the electrical box assembly 5 includes multiple layers or a non-standard thickness, such that the electrical box 10 may be desirably positioned relative to an outer and exposed surface of the corresponding wall structure.

The threaded fastener 50 (shown in isolation in FIG. 3) includes, with respect to an axial direction of the threaded fastener 50, a head 52, a substantially cylindrical portion 54, a flange or shoulder 56, and a threaded portion 58. The head 52 is formed at a first end of the fastener 50 and includes a tool indentation 51 formed in an axial end thereof, wherein the tool indentation 51 is configured to receive a rotational tool (not shown) therein for rotating the threaded fastener about a central longitudinal axis thereof, such as receiving the operational end of a screw driver or similar tool. The cylindrical portion 54 is formed between the head 52 and the flange 56 and includes a reduced diameter in comparison to each of the head 52 and the flange 56. The threaded portion 58 extends from adjacent the flange 56 to a second end of the fastener 50 and also includes a reduced diameter in comparison to each of the head 52 and the flange 56. More specifically, a thread of the threaded portion 58 includes a maximum outer diameter that is less than an outer diameter of either of the head 52 or the flange 56.

The electrical box 10 includes a back wall 6, a pair of opposing sidewalls 7, and a pair of opposing end walls 8, which cooperate to define a hollow interior space of the electrical box 10 having a front opening 3 permitting access to the interior space at a front face 4 of the electrical box 10, wherein the front face 4 forms a surface of the electrical box 10 arranged opposite the back wall 6 thereof. The walls 6, 7, 8, which extend rearwardly from the front face 4 to surround and define the hollow interior space of the electrical box 10, may be said to form an outer circumferential surface of the electrical box 10 extending circumferentially around the hollow interior space. As shown, the electrical box 10 is formed as a unitary structure. However, the electrical box 10 can be formed from independent parts assembled together without necessarily departing from the scope of the present invention. Further, the electrical box 10 shown is formed from a molding process, although other forming processes can be used, as desired. The electrical box 10 may be formed from a substantially rigid material capable of being formed into the disclosed shape and configuration. The rigid material may be any of a number of moldable thermoplastics including PVC, polycarbonate, polyphenylene oxide, or fiberglass-reinforced polyester, as non-limiting examples. Other rigid materials may be utilized for forming the electrical box 10 without departing from the scope of the present invention. The electrical box 10 may include knock-outs, doors, or the like for introducing electrical components into the interior of the electrical box 10. The electrical box 10 further includes structure for mounting additional structure to the electrical box 10, such as coupling features for mounting an outlet cover or the like to the front face 4 of the electrical box 10, as desired.

Figure 8:
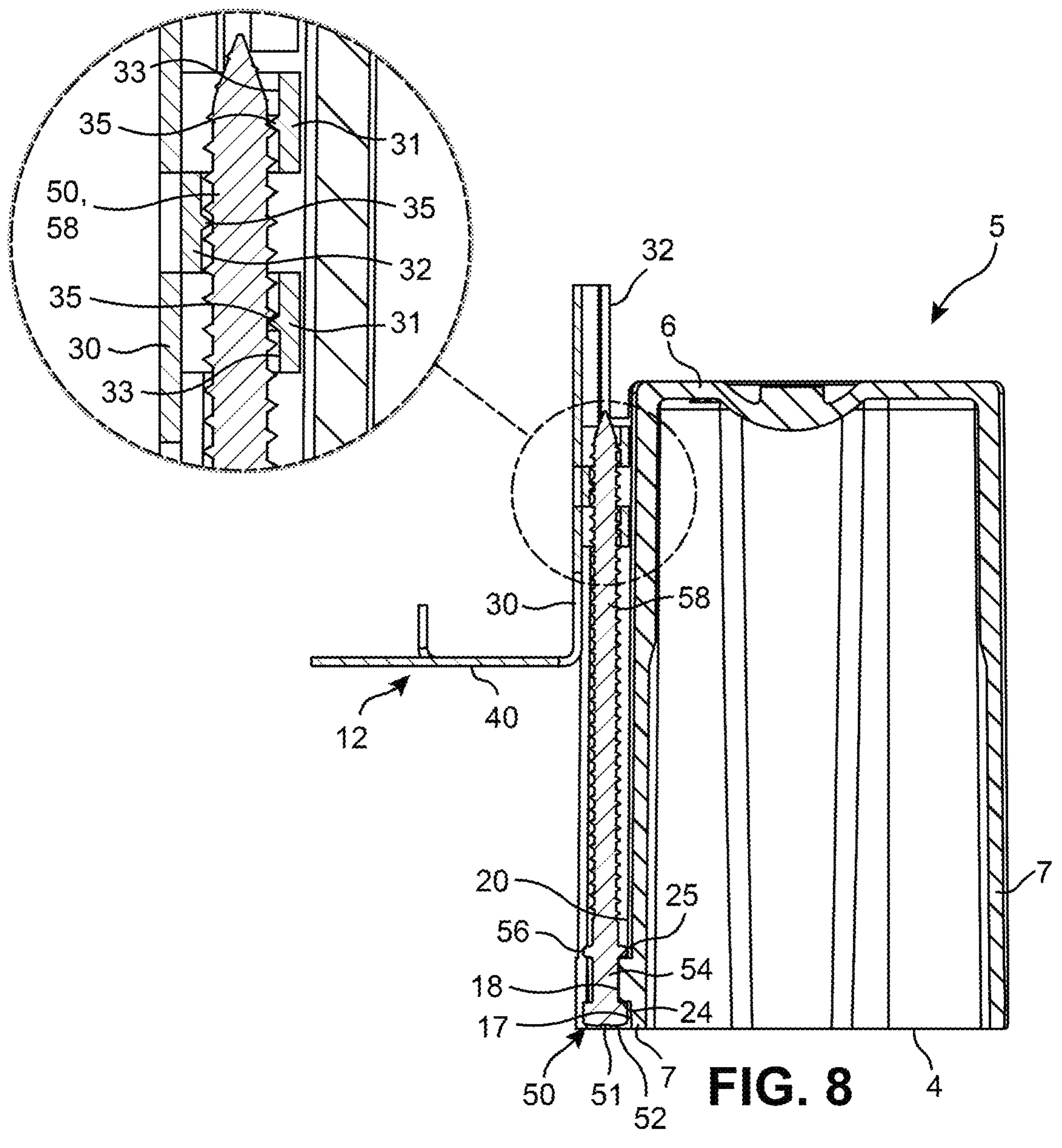
FIG. 8 is a cross-sectional view taken through a central plane of the threaded fastener of the electrical box assembly.
Figure 9:
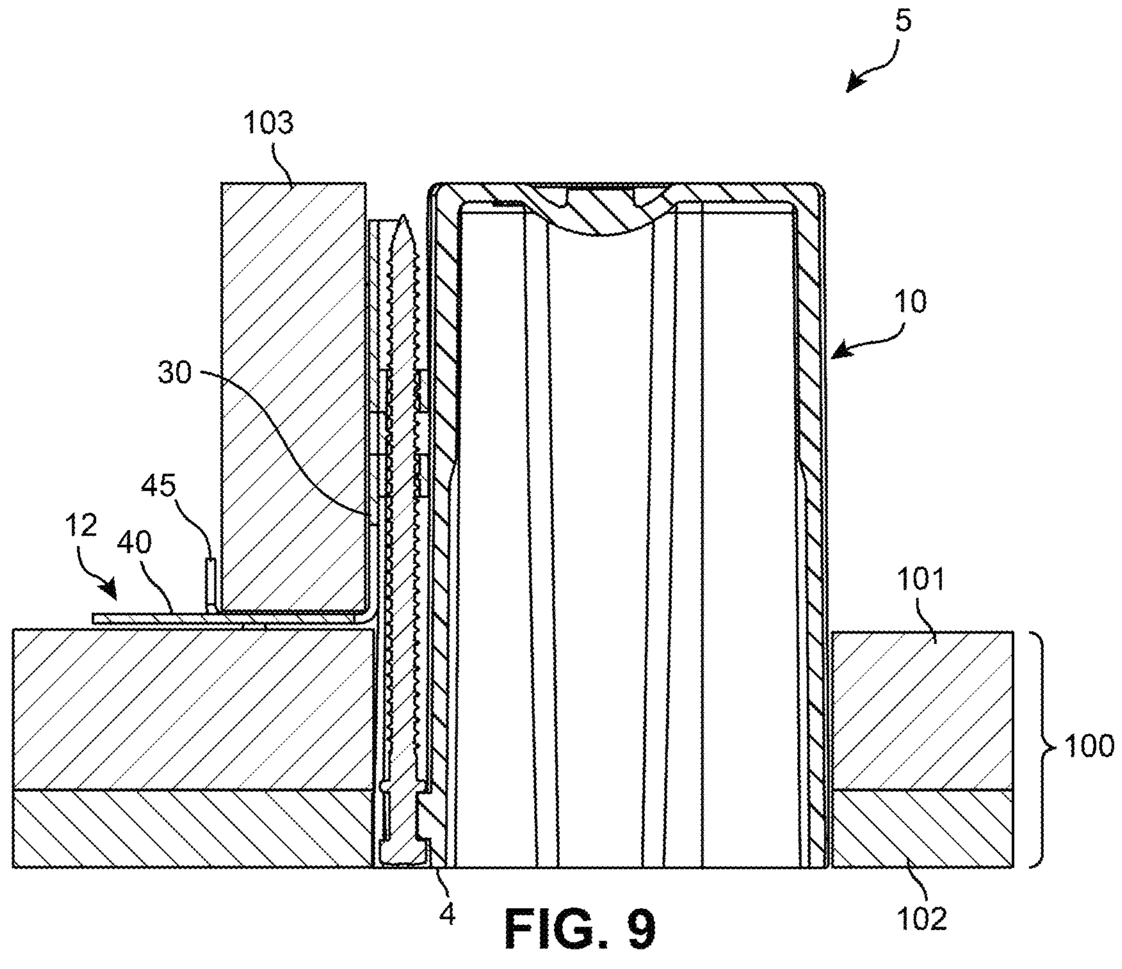
FIG. 9 is a cross-sectional view showing an adjustment of the electrical box assembly from the configuration of FIG. 8 with the electrical box assembly installed relative to an exemplary wall structure and support member.

A channel 16 is formed in one of the opposing sidewalls 7 of the electrical box 10 and is configured to receive at least a portion of the threaded fastener 50 therein during operational use of the electrical box assembly 5, as best shown in FIGS. 8 and 9. The channel 16 is provided as a laterally extending indentation formed in an outer surface of the corresponding one of the sidewalls 7 that is indented in a direction towards the interior space of the electrical box 10 (and towards the opposing one of the sidewalls 7 disposed opposite the channel 16). As used hereinafter, the lateral direction refers to a direction extending between the opposing sidewalls 7, which may be a horizontal direction in accordance with an installed orientation of the electrical box assembly 5 according to the present embodiment. The channel 16 further extends from the front face 4 of the electrical box 10 and towards the back wall 6 with respect to an axial direction of the electrical box assembly 5 arranged perpendicular to the described lateral direction, and may extend along an entirety of an axial dimension of the electrical box 10 from the front face 4 to the rearward surface of the back wall 6, as desired. The axial direction may also be a horizontal direction according to the installed orientation of the electrical box assembly 5 as disclosed herein. The channel 16 includes a varying configuration (cross-sectional shape) when extending rearwardly from the front face 4 towards the back wall 6 and includes, with respect to the rearwardly extending axial direction, a first portion 17, a second portion 18, and a third portion 20.

The first portion 17 of the channel 16 is formed at the front face 4 of the electrical box 5 and includes a cross-section having a combination of a laterally inwardly disposed semi-circular portion and a laterally outwardly disposed rectangular portion leading into the semi-circular portion. The first portion 17 is dimensioned to receive the head 52 of the threaded fastener 50 therein during a lateral movement of the head 52 into the first portion 17 of the channel 16, and is further dimensioned to allow for rotation of the head 52 about the central axis of the threaded fastener 50 when received within the first portion 17. The cross-sectional shape of the first portion 17 may be considered to be a truncated stadium shape having only one semi-circular portion disposed at the end of the corresponding rectangular portion.

The second portion 18 of the channel 16 is formed immediately rearwardly of the first portion 17 thereof and includes a cross-section having a cylindrical shape arranged concentrically relative to the semi-circular portion of the cross-section of the first portion 17, thereby allowing for the cylindrically shaped threaded fastener 50 to be axially received through each of the first portion 17 and the second portion 18. The cylindrical shape formed by the second portion 18 includes a diameter that is less than a diameter of the first portion 17 to cause a front-facing surface of the second portion 18 to form a first shoulder 24 where the channel 16 reduces in cross-section from the first portion 17 to the second portion 18. The cylindrical shape of the second portion 18 forms a circular arc that extends through greater than 180° of angular displacement relative to a central axis of the cylindrical shape to cause the second portion 18 to include a mouth 19 having a reduced dimension in comparison to a distance between diametrically opposing sides of the circular arc. The mouth 19 is selected to have a slightly smaller dimension than the cylindrical portion 54 of the threaded fastener 50 while the circular arc includes a diameter slightly greater than that of the cylindrical portion 54. The mouth accordingly 19 allows for the lateral entry of the cylindrical portion 54 of the threaded fastener 50 into the second portion 18 of the channel 16 in a snap-fit manner that facilitates a removable coupling of the threaded fastener 50 to the electrical box 10 and the ability to rotate the cylindrical portion 54 within and relative to the second portion 18 of the channel 16.

The third portion 20 is formed immediately rearwardly of the second portion 18 and includes an enlarged cross-section relative thereto to cause the channel 16 to enlarge when progressing rearwardly from the second portion 18. This enlargement of the channel 16 at the transition to the third portion 20 results in a rearward facing surface of the second portion 18 forming a second shoulder 25. The third portion 20 may have substantially any cross-sectional shape so long as the second shoulder 25 is formed at the transition of the channel 16 from the second to third portions 18, 20, and so long as the threaded portion 58 of the threaded fastener 50 is receivable within the third portion 20 without intruding upon the electrical box 10 or interfering with operation of the bracket 12.

At least one bracket-receiving opening 26 is formed on the electrical box 10 on the same one of the opposing sidewalls 7 as the channel 16. The present embodiment includes a pair of the bracket-receiving openings 26 with each of the bracket-receiving openings 26 respectfully formed adjacent one of the opposing end walls 8 of the electrical box 10, although it is understood that the bracket-receiving openings 26 can be formed at intermediate locations on the one of the opposing sidewalls 7, as desired, so long as the bracket 12 engages the bracket-receiving openings 26 in a guiding fashion as described herein. The bracket-receiving openings 26 are positioned on the one of the sidewalls 7 to opposing sides of the channel 16 with respect to a height direction of the electrical box 10 extending between the opposing end walls 8 thereof, wherein the height direction is perpendicular to each of the lateral direction and the axial direction. In the embodiment shown, each of the bracket-receiving openings 26 extends uninterrupted from the front face 4 of the electrical box 10 and through the rearward surface of the back wall 6 thereof. However, it is understood that the bracket-receiving openings 26 can have a length shorter than a length from the front face 4 to the back wall 6, and thus be spaced from one or both of the front face 4 and the back wall 6, without necessarily departing from the scope of the present invention.

Each of the bracket-receiving openings 26 is open in a direction towards the centrally disposed channel 16 and includes a first segment **26*a* and a second segment 26*b*, wherein each of the segments 26*a*, 26*b* extends axially along the length of the corresponding bracket-receiving opening 26. The first segment 26*a* extends from the open portion of the corresponding bracket-receiving opening 26 towards the second segment 26*b* and the second segment 26*b* extends away from the first segment 26*a* and forms an inwardly disposed and vertically outward end of each of the respective bracket-receiving openings 26. As used herein, a height direction of the electrical box assembly 5 refers to a direction extending between the opposing end walls 8 of the electrical box 10 and is arranged perpendicular to each of the axial direction and the lateral direction thereof. The height direction may be a vertical direction according to the installed orientation of the electrical box assembly 5. As used hereinafter, references to vertically extending features of the electrical box assembly 5 refer to those features extending in the described height direction of the electrical box assembly 5. The first segment 26*a* extends laterally inwardly towards the interior space of the electrical box 10 (towards the opposing one of the sidewalls 7 not having the channel 16 and bracket-receiving openings 26 formed therein) and then vertically outwardly towards a corresponding one of the end walls 8 to cause the first segment 26*a* of each of the bracket-receiving openings 26 to be arranged at an incline with respect to the lateral and vertical directions of the electrical box 10. Specifically, at least an outer surface of the one of the sidewalls 7 defining an inner disposed and outwardly facing surface of the corresponding bracket-receiving opening 26 (facing away from the interior of the electrical box 10) includes a surface inclined with respect to the lateral and vertical directions. The second segment 26*b* extends in the vertical direction away from the corresponding first segment 26*a* and towards the adjacent one of the end walls 8. Specifically, at least the outer surface of the one of the sidewalls 7 defining the corresponding bracket-receiving opening 26 includes a surface extending exclusively in the vertical direction away from the inclined surface of the first segment 26*a***.

The manner in which each of the bracket-receiving openings 26 extends at least partially laterally inwardly towards the interior of the electrical box 10 and then vertically outwardly towards the adjacent one of the end walls 8 results in the formation of a flanged portion 28 of the one of the sidewalls 7 that forms an outer disposed and inwardly facing surface defining at least a portion of the corresponding bracket-receiving opening 26. That is, each of the bracket-receiving openings 26 is formed as an open space disposed between an inner disposed and outwardly facing surface of the one of the sidewalls 7 and an outwardly disposed and inwardly facing surface of the corresponding one of the flanged portions 28. In the provided embodiment, each of the flanged portions 28 defines a vertically extending and inwardly facing surface along the second segment 26*b* of the corresponding bracket-receiving opening 26, thereby resulting in the flanged portion 28 being devoid of an inclined surface opposing that of the first segment 26*a*. However, in some embodiments, the flanged portion 28 may further define an inwardly facing surface having an incline similar to or matching that of the incline of the one of the sidewalls 7 along the first segment 26*a*, as desired, without necessarily departing from the scope of the present invention.

A surface of the electrical box 10 defining each of the respective bracket-receiving openings 26 further includes a pair of protuberances 36 or interference guides 36 projecting therefrom for aiding in locating and guiding the bracket 12 relative to the electrical box 10. Specifically, a surface of the corresponding sidewall 7 defining a corresponding one of the bracket-receiving openings 26 includes a first one of the protuberances 36 projecting outwardly and away from the interior space of the electrical box 10 along an outward facing portion of the first segment 26*a* thereof and a second one of the protuberances 36 projecting inwardly towards the interior space along an inward facing portion of the second segment 26*b*, which corresponds to the inwardly facing surface of the corresponding flanged portion 28. Each of the protuberances 36 further extends in the axial direction of the electrical box 10 from the front face 4 to the back wall 6 thereof with each of the protuberances 36 extending substantially in parallel to the direction of axial extension of the corresponding bracket-receiving opening 26 into which each pair of the protuberances 36 protrudes. However, each of the protuberances 36 may be provided to extend along only a portion of the axial length of the corresponding one of the sidewalls 7 and may thus be spaced from one or both of the front face 4 and the back wall 6. Further as shown, the protuberances 36 have a generally arcuate cross-sectional shape when projecting away from the corresponding surface, although other shapes can be used, as desired. One or both of the axial ends of each of the protuberances 36 may be tapered to aid in piloting an end of a corresponding one of the wings 32 of the bracket 12 therein when initially entering the bracket-receiving openings 26. In the illustrated embodiment, the tapered end may be formed by a quarter-sphere shape that transitions to the arcuate cross-sectional shape of each of the protuberances 36, although other tapered shapes may be utilized in piloting the wings 32. In the embodiment shown, the protuberances 36 extend from a position immediately adjacent the front face 4 of the electrical box 10 to a position immediately adjacent the back wall 6 of the electrical box 10.

The bracket 12 may be produced from a plated carbon steel, although other materials can be used, as desired. The bracket 12 includes a main body 30 which is substantially planar and plate-like in configuration. A wing 32 (also referred to as a stepped portion 32) extends from each of the opposing ends of the main body 30 corresponding to the vertically upper and lower ends of the main body 30 when the bracket 12 is operatively engaging the electrical box 10. Each of the wings 32 is configured to be slidably received in one of the bracket-receiving openings 26 of the electrical box 10 during operational use of the electrical box assembly 5. Each of the wings 32 includes an inclined portion 32*a* extending from the respective upper or lower end of the main body 30 and an offset portion 32*b* extending from an end of the inclined portion 32*a* formed distally relative to the main body 30. When the bracket 12 operatively engages the electrical box 10, the inclined portion 32*a* of each of the wings 32 is disposed at an incline with respect to each of the lateral direction and the vertical direction while the offset portion 32*b* of each of the wings 32 is arranged in the vertical direction in parallel to the main body 30. Each of the inclined portions 32*a* may include an incline substantially similar to or the same as the incline of the first segment 26*a* of the corresponding one of the bracket-receiving openings 26. The offset portions 32*b* of the wings 32 may be arranged coplanar with each other and are offset laterally from the plane of the main body 30 as a result of the extension of the inclined portions 32*a* away from the main body 30.

The main body 30 of the bracket 12 further includes a plurality of guide structures 31, 34 for guiding the axial motion of the threaded fastener 50 relative to the bracket 12 during operational use of the electrical box assembly 5. The guide structures 31, 34 of the present embodiment include a pair of first guide structures 31 with each of the first guide structures 31 engaging the threaded portion 58 of the threaded fastener 50 to a first diametric side thereof and a second guide structure 34 engaging the threaded portion 58 to a second diametric side thereof opposite the first diametric side. The guide structures 31, 34 project away from a surface of the main body 30 facing towards the sidewall 7 of the electrical box 10 having the channel 16 and the bracket-receiving openings 26 formed therein. The first guide structures 31 are positioned axially to either axial side of the second guide structure 34 to result in an alternating configuration of the first and second guide structures 31, 34 when progressing in the axial direction of the electrical box assembly 5.

Each of the first guide structures 31 is formed as a strip of the main body 30 extending laterally outwardly away from the plane of the remainder of the main body 30 in a substantially triangular shape for forming an aperture 33 extending around and receiving the threaded portion 58 of the threaded fastener 50 therein. The aperture 33 formed by each of the respective first guide structures 31 includes a cylindrically shaped surface at a laterally inward side thereof where the legs of the triangular shape meet at a position disposed distally from the plane of the main body 30, wherein each of the apertures 33 is configured to receive the threaded portion 58 therethrough for guiding axial movement of the threaded fastener 50.

Figures 6, 7:
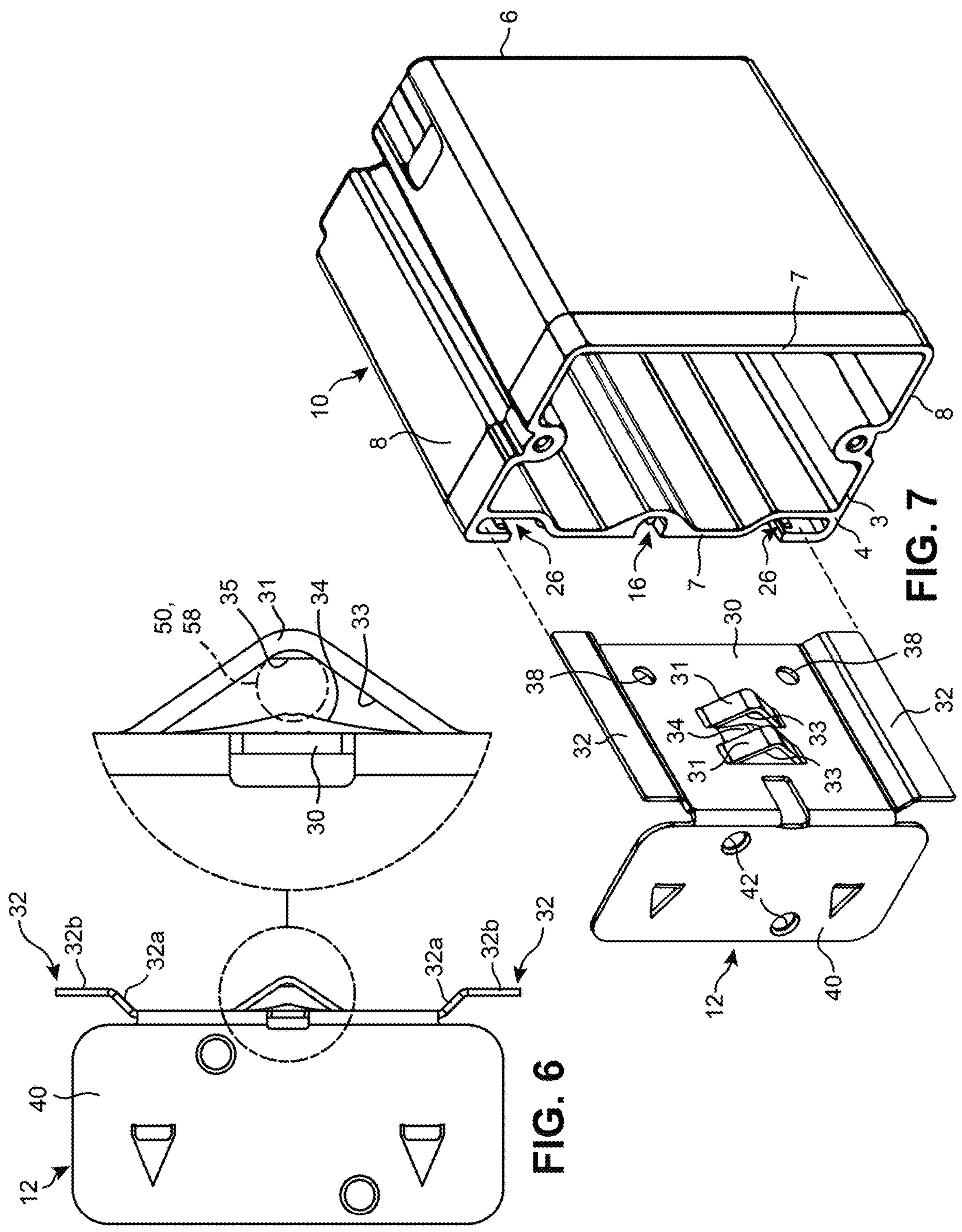
FIG. 6 is a front elevational view showing a bracket of the electrical box assembly of FIGS. 1 and 2 in isolation with an enlarged view of an encircled portion of the bracket having guide structures for guiding a threaded fastener of the electrical box assembly.
FIG. 7 is a front perspective view of the electrical box and the bracket showing the manner in which the bracket is slidably received within openings formed in the electrical box.

The second guide structure 34 is also a triangular strip of the main body 30 extending laterally outwardly away from the plane of the remainder of the main body 30 in similar fashion to each of the first guide structures 31, but the second guide structure 34 projects away from the plane of the main body 30 by a smaller lateral distance than each of the first guide structures 31 to position the second guide structure 34 to the opposing diametric side of the threaded fastener 50 in comparison to each of the first guides 31. The threaded portion 58 of the threaded fastener 50 is axially receivably through each of the apertures 33 of the first guide structures 31 and along the exposed surface of the second guide structure 34 to constrain the threaded portion 58 to move only axially relative to the bracket 12. FIG. 6, which includes an enlarged view of the first and second guide structures 31, 34, illustrates the threaded fastener 50 in broken line format to show the manner in which the threaded portion 58 thereof may be received between the diametrically opposing surfaces of the first and second guide structures 31, 34 to constrain the threaded fastener 50 to move axially along the central axis thereof, which coincides with the axial direction of the electrical box assembly 5 when the threaded fastener 50 is operatively engaging the electrical box 10 and the bracket 12.

As shown in FIGS. 6 and 8, at least one thread engaging projection 35 may project from a facing surface of one or more of the guide structures 31, 34 for engaging the thread of the threaded portion 58 of the fastener 50. Specifically, one or both of the first guide structures 31 may include one of the thread engaging projections 35 disposed along the cylindrically shaped surface thereof for engaging the first diametric side of the threaded portion 58 and the second guide structure 34 may include one of the thread engaging projections 35 disposed along a distal surface of the second guide structure 34 for engaging the second diametric side of the threaded portion 58. Each of the thread engaging projections 35 is configured to be receivable between adjacent and axially spaced apart segments of the thread of the threaded portion 58 such that rotation of the threaded fastener 50 about the central axis thereof results in an axial pushing of each of the thread engaging projections 35 in a forward or rearward axial direction, depending on the direction of rotation of the threaded fastener (clockwise or counterclockwise). In the example shown in FIG. 8, each of the guide structures 31, 34 includes one of the thread engaging projections 35, but it should be apparent that fewer or more of the thread engaging portions 35 may be utilized while remaining within the scope of the present invention, including the use of only a single one of the thread engaging projections 35 on only one of the guide structures 31, 34.

The main body 30 may include one or more apertures 38 to facilitate insertion of fasteners (not shown) to couple the main body 30 to a support member such as a joist, a stud, or another structural component of a building acting as a mounting structure or surface. The main body 30 may include any configuration and number of the apertures 38 for establishing a desired coupling of the bracket 12 to the corresponding support member.

In some embodiments, an angled body 40 extends from the main body 30, wherein the angled body 40 may be provided as a substantially planar and plate-like structure. The main body 30 and the angled body 40 may be formed from a single piece of material, although the main body 30 and the angled body 40 can be formed from separate pieces of material and coupled to each other by any known fastening method, as desired. If formed from a single piece of material, the bracket 12 may be formed as a planar blank arranged on the plane of the main body 30, and may be subsequently bent to form the bracket 12 as shown throughout the figures. Specifically, the angled body 40 may be provided to extend from an axial end of the main body 30 disposed towards the front face 4 of the electrical box 10. Further, in the embodiment shown, an angle of 90 degrees is formed between the main body 30 and the angled body 40, although other angles can be provided to accommodate differing mounting configurations.

Apertures 42 may be provided in the angled body 40 to facilitate insertion of fasteners (not shown) to couple the angled body 40 to a support member such as a joist, a stud, or another structural component of a building acting as a mounting structure or surface. The angled body 40 may include any configuration and number of the apertures 38 for establishing a desired coupling of the bracket 12 to the corresponding support member.

The angled body 40 may further include at least one bendable tab 45 that is able to be bent from a configuration wherein the bendable tab 45 is arranged co-planar to the plane of the angled body 40 to a configuration wherein the bendable tab 45 is arranged transverse relative to the plane of the angled body 40, such as being arranged perpendicular relative to the plane of the angled body 40. Each of the tabs 45 may be disposed at a distance from the main body 30 sufficient for receiving the support member to which the bracket 12 is coupled between a face of each of the tabs 45 and the facing surface of the main body 30. That is, the support member, such as a stud, joist, etc., may be sandwiched between each of the bent tabs 45 and the main body 30. However, the bendable tabs 45 may be maintained in the parallel and co-planar configuration (absent bending) where the corresponding support member would otherwise interfere with the angled body 40, such as a support member having a relevant dimension greater than a distance present between a base of each of the bendable tabs 45 and the main body 30 such that a sandwiching of the support member is not readily achievable.

To assemble the electrical box assembly 5, the cylindrical portion 54 of the threaded fastener 50 is snapped into the relatively narrow second portion 18 of the channel 16 with the head 52 received within the first portion 17 thereof and the threaded portion 58 received within the third portion 20 thereof. The wings 32 of the main body 30 of the bracket 12 are then inserted into the bracket-receiving openings 26 of the electrical box 10, which may include the wings 32 entering the bracket-receiving openings 26 in a forward axial direction with the wings 32 at the back wall 6 of the electrical box 10 such that the bracket 12 is slid axially towards the opposing front face 4 of the electrical box 10. The bracket 12 can then be slid towards the fastener 50 until the second end thereof including the threaded portion 58 is received into a first one of the guide structures 31, 34, which in the present embodiment includes the threaded portion 58 passing through one of the apertures 33 defined by a corresponding one of the first guide structures 31.

During and after insertion of the bracket 12 into the bracket-receiving openings 26 of the electrical box 10, the protuberances 36 abut a surface of the bracket 12. Thus, the protuberances 36 ensure a snug fit between the electrical box 10 and the bracket 12. The snug fits helps minimize any relative movement between the electrical box 10 and the bracket 12, which helps minimize and noise, damage, or wobble. More specifically, as best shown in FIG. 1, the laterally inward facing protuberance 36 formed along the second segment **26*b* on the flanged portion 28 of the corresponding one of the bracket-receiving openings 26 engages the offset portion 32*b* of the corresponding wing 32 along a laterally outward facing surface thereof while the laterally outward facing protuberance 36 formed along the first segment 26*a* on the corresponding sidewall 7 engages the inclined portion 32*a* of the corresponding wing 32 along a laterally inward facing surface thereof. The engagement of each of the wings 32 with oppositely arranged ones of the protuberances 36 may result in a partial and substantially elastic bending/deformation of one or both of the bracket 12 or the electrical box 10 adjacent the engaging surfaces to ensure the previously described snug fit due to the increased friction generated by the tight fit of the corresponding wing 32 between the opposing protuberances 36**.

The threaded fastener 50 is then rotated to threadingly engage the thread engaging projections 35 formed on one or more of the guide structures 31, 34 and/or the main body 30 of the bracket 12 to further slide the bracket 12 to a desired axial position with respect to the electrical box 10. In embodiments without the angled body 40, the main body 30 is coupled to the structural support. In the embodiments including the angled body 40, the angled body 40 can be coupled to the structural support in addition to or in place of the main body 30. Further adjustment to the position of the electrical box 10 with respect to the bracket 12 and the corresponding structural support can be made as desired to ensure proper positioning and alignment with the structural support or other structures such as dry wall or other building materials. Accordingly, the electrical box assembly 5 includes a mounting system which facilitates repositioning of the electrical box 10, wherein an case of repositioning the electrical box 10 is maximized.

FIG. 9 illustrates one exemplary and non-limiting use of the electrical box assembly 5 wherein an adjustment of the axial position of the electrical box 10 relative to the bracket 12 may be desirable. The provided example includes a wall structure 100 comprising an inner layer 101 and an outer layer 102 stacked upon one another, wherein each of the layers 101, 102 may be representative of any form of building material suitable for forming the wall structure. In one non-limiting example, the inner layer 101 is a layer of drywall while the outer layer 102 is a layer of paneling or the like disposed on the inner layer 101. The addition of the outer layer 102 to the inner layer 101, which may result in a non-standard thickness of the resulting wall structure, may result in the need to adjust the electrical box 10 to bring the front face 4 of the electrical box 10 to a position adjacent or flush to the exposed surface of the outer layer 102.

In the provided example, the bracket 12 is disposed at a position wherein the bracket 12 may be coupled to a corresponding support member 103 of the wall structure 100, which may be representative of a stud 103 associated with the wall structure 100, via the passage of fasteners through the apertures 38, 42 of either of the main body 30 or the angled body 40 (or both), each of which may be positioned immediately adjacent or in contact with a corresponding side surface of the support member 103. Additionally, the support member 103 is shown as being disposed laterally between the main body 30 of the bracket 12 and the at least one bendable tab 45 when the at least one tab 45 is bent perpendicular to the plane of the angled body 40 and in parallel to the plane of the main body 30. It can be seen by a comparison of FIG. 8 to FIG. 9 that the bracket 12 has been adjusted to move axially towards the front face 4 of the electrical box 10 until a distance between the angled body 40 of the bracket 12 and the front face 4 of the electrical box 10 is substantially equal to a thickness of the combined wall structure 100 comprising the inner and outer layers 101, 102, thereby aligning the front face 4 of the electrical box 10 with the exposed surface of the wall structure 100 formed by the outermost surface of the outer layer 102.

It should be readily apparent to one skilled in the art that the disclosed electrical box assembly 5 may be installed relative to a wall structure and corresponding support member having substantially any orientation, such as forming a floor structure or ceiling structure, as desired. Such configurations may include the axial direction of the electrical box assembly 5 being vertically arranged while the lateral and height directions thereof are arranged horizontally. It should also be apparent that the electrical box assembly 5 need not be installed when in the disclosed upright orientation, and may be rotated to accommodate any desired installation configuration. For example, the electrical box assembly 5 may be installed relative to a horizontally extending support member with the described height direction horizontally arranged and the described lateral direction vertically arranged. The illustrated orientation of the electrical box assembly 5 is thus non-limiting.

The bracket 12 as disclosed herein may be manufactured from a substantially planar and plate-like blank (not shown) having the guide structures 31, 34 projecting from an inboard region thereof, wherein the wings 32 and the angled body 40 are formed by bending peripheral portions of the blank to the disclosed configuration. Specifically, the angled body 40 may be bent to a desired angle relative to the main body 30 along one bend region and each of the wings 32 may be bent twice along two spaced apart bend regions to form the inclined and offset portions 32a, 32b thereof. The described bendable tabs 45 may also be initially disposed on the plane of the blank and may be bent away therefrom along respective bend regions thereof. However, the bracket 12 may be formed into the disclosed configuration utilizing alternative methods, as desired.

Referring now to FIGS. 10-14, an electrical box assembly 105 according to another embodiment of the present invention is disclosed. The electrical box assembly 105 includes the electrical box 10, the bracket 12 slidably engaging the electrical box 10, and the threaded fastener 50 configured to operably engage the bracket 12 in the same manner as the electrical box assembly 5 of FIGS. 1-9, but further includes the electrical box 10 having a sealing element 140 disposed adjacent the front face 4 thereof. The sealing element 140 is provided for establishing a vapor barrier via engagement of the sealing element 140 to an inner facing surface 100a of a corresponding wall structure 100 (FIG. 14) during an adjustment of the electrical box 10 to a desired axial position relative to an outer facing surface 100b of the wall structure 100.

The sealing element 140 is presented in FIGS. 10-14 as a vapor barrier forming flange 140, referred to as the flange 140 hereinafter. The flange 140 includes a first surface 141 facing towards the front face 4 of the electrical box 10, an oppositely arranged second surface 142 facing towards the back wall 6 of the electrical box 10, a rim 143 connecting the first surface 141 to the second surface 142 about an outer periphery of the flange 140, and an inner surface 144 (FIG. 14) contacting an outer surface of each of the side walls 7 and end walls 8 of the electrical box 10 while also connecting the first surface 141 to the second surface 142 opposite the rim 143. The flange 140 extends laterally outwardly from the side walls 7 and end walls 8 of the electrical box 10 at a position disposed intermediate the front face 4 and the back wall 6 thereof. The flange 140 may be spaced from the front face 4 of electrical box 10 by a distance suitable for accommodating the thickness of the adjacent wall structure 100. The portion of the electrical box 10 extending in front of the inner surface 144 of the flange 140 (towards the front face 4 of the electrical box 10) may accordingly extend axially along a length that is substantially equal to the thickness of the wall structure 100. For conventional drywall constructions, this distance may be about 7/16 of an inch for a single layer of drywall, as one non-limiting example. The inner surface 144 of the flange 140 forms a fluid tight seal with the outer surface of each of the side walls 7 and end walls 8 when disposed thereon for preventing the passage of air or other fluids between the inner surface 144 of the flange 140 and the outer surface of each of the side walls 7 and end walls 8.

The flange 140 is resiliently flexible to aid in forming the vapor barrier relative to the inner facing surface 100a of the wall structure 100, as explained hereinafter. The phrase “resiliently flexible” as used herein means that when the flange 140 is bent and released, the flange 140 will elastically return to the position shown throughout FIGS. 10-13, when the flange 140 is exposed to room temperature. The flange 140 may accordingly be formed from a suitable resiliently flexible polymeric material, such as an elastomeric material, as desired. The polymeric materials used to form the flange 140 may include polyesters, polyurethanes, polyethers, polyamides, polyimides, polycarbonates, polyvinylchloride, and combinations thereof. According to a preferred embodiment, the flange 140 is formed from thermoplastic copolyester (TPC).

Figure 10:
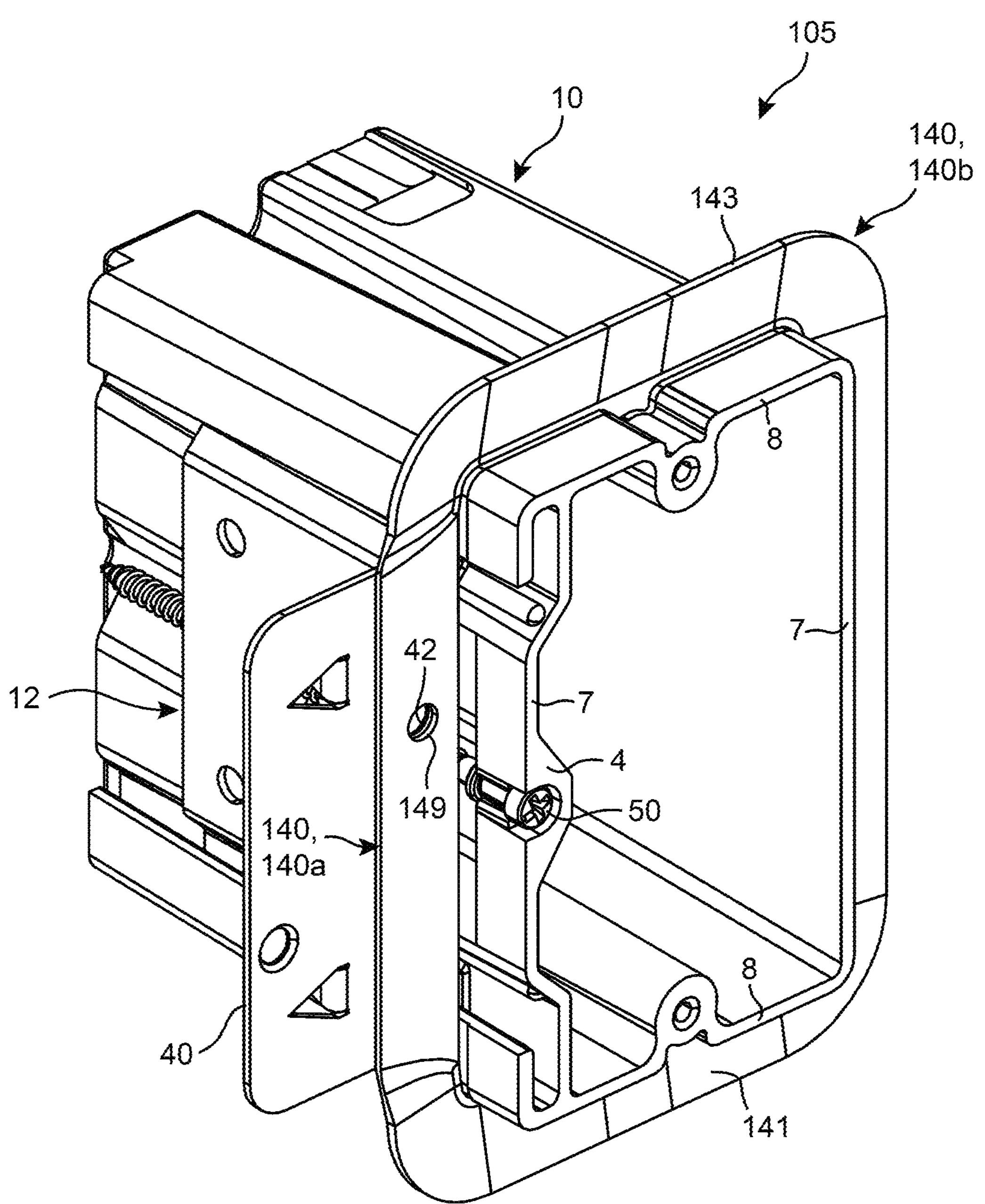
FIG. 10 is a front perspective view of an adjustable electrical box assembly having a flanged sealing element according to another embodiment of the present invention.
Figures 11, 12:
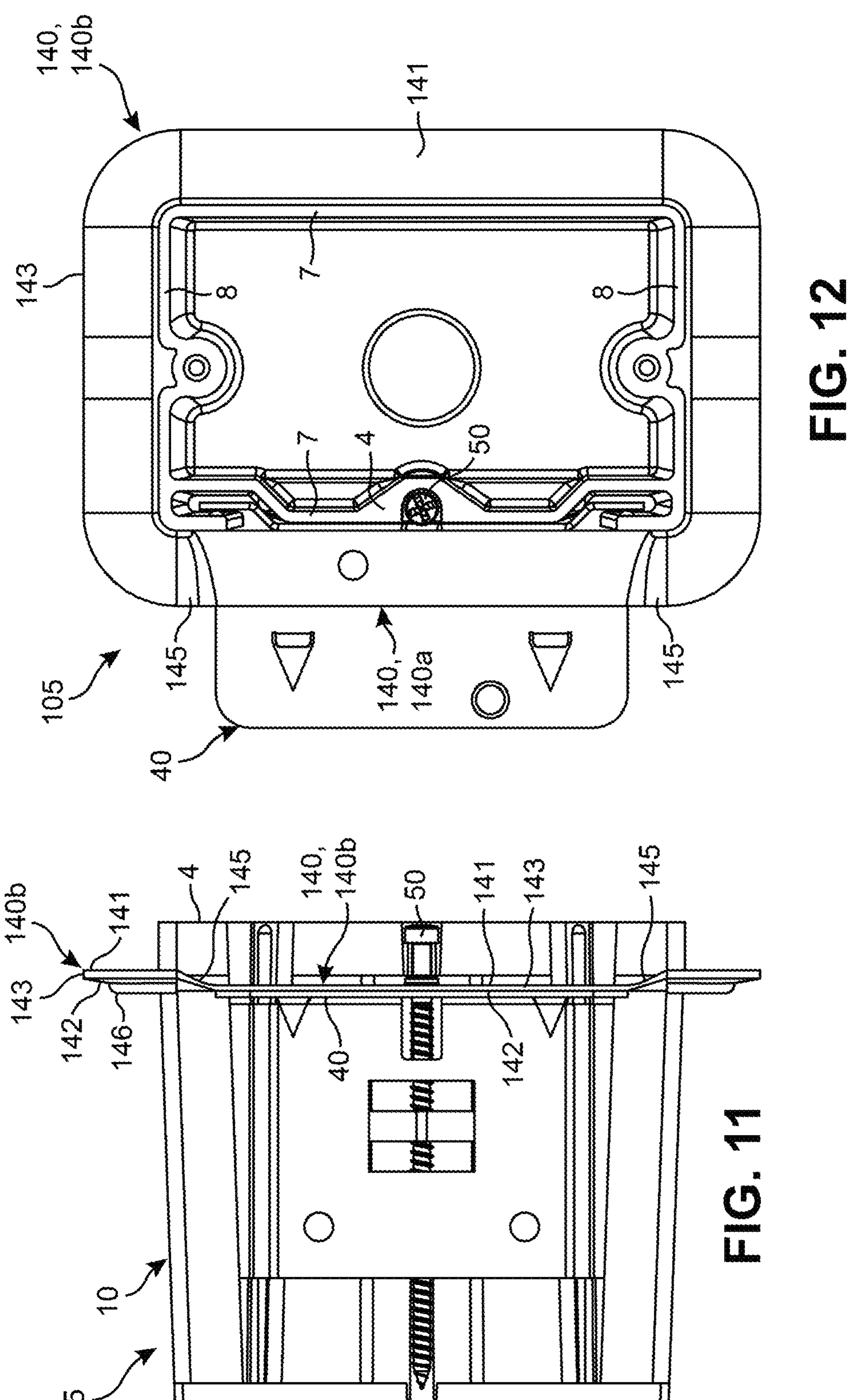
FIG. 11 is a side elevational view of the adjustable electrical box assembly of FIG. 10.
FIG. 12 is a front elevational view of the adjustable electrical box assembly.

As best shown in FIGS. 10 and 11, the flange 140 may be divided into a first portion 140*a* that is aligned with the angled body 40 of the bracket 12 with respect to the axial direction of the electrical box 10 and a second portion 140*b* that is not aligned with the angled body 40 of the bracket 12 with respect to the axial direction. The first portion 140*a* is accordingly arranged along the one of the side walls 7 having the bracket 12 slidably coupled thereto, with the first portion 140*a* extending along a majority of one of the four sides of the substantially rounded-rectangular shape of the flange 140 when viewed along the axial direction of the electrical box 10, as shown in FIG. 12. The second portion 140*b* accordingly extends around the remaining three surfaces of the electrical box 10 corresponding to the end walls 8 and the opposing side wall 7.

As best shown in FIG. 11, the first portion 140*a* of the flange 140 is substantially planar and is arranged along a plane perpendicular to the axial direction of the electrical box 10, which may also correspond to being arranged along a plane parallel to a plane of the front face 4 of the electrical box 10. The planar nature of the first portion 140*a* results in the rim 143 and the inner surface 144 being disposed on a common plane that is similarly perpendicular to the axial direction of the electrical box 10 and parallel to the front face 4 thereof, and also for the first surface 141 and the oppositely arranged second surface 142 of the flange 140 to be arranged on planes arranged perpendicular to the axial direction of the electrical box 10 and parallel to the front face 4 thereof. The first portion 140*a* may be referred to as the planar portion of the flange 140 by virtue of the substantially planar configuration thereof, as desired. As shown in FIG. 11, the second surface 142 of the flange 140 along the first portion 140*a* may define a maximum axial movement of the bracket 12 towards the front face 4 of the electrical box 10 as a result of the angled body 40 thereof engaging the second surface 142 at the illustrated position. As can be seen in FIG. 10, the first portion 140*a* may include at least one fastener opening 149 formed therethrough between the opposing surfaces 141, 142 with each of the at least one fastener openings 149 aligned with a corresponding one of the apertures 42 of the angled body 40. The present embodiment illustrates only a single pairing of an aperture 42 and a fastener opening 149, but additional pairings may be formed in the bracket 12 and the flange 140, as needed, to desirably couple the electrical box assembly 5 to the corresponding wall structure 100.

The second portion 140*b* of the flange 140 differs from the first portion 140*a* thereof in that the rim 143 along the second portion 140*b* of the flange 140 is offset towards the front face 4 of the electrical box 10 relative to a plane defined by where the inner surface 144 of the flange 140 extends around the periphery of the electrical box 10 as formed by the side walls 7 and end walls 8 thereof, whereas, in contrast, the first portion 140*a* includes the inner surface 144 and the rim 143 having a co-planar relationship. This offset, which is towards the front face 4 with respect to the axial direction of the electrical box 10, results in the flange 140 having a forward or frontward inclination along the second portion 140*b* thereof, as opposed to the planar and axially perpendicular arrangement of the flange 140 along the first portion 140*a*. The flange 140 may accordingly be described as having a slight axial taper along the second portion 140*b* thereof as the flange 140 projects outwardly away from the outer surface of the electrical box 10, and the second portion 140*b* may alternatively be referred to as the inclined portion of the flange 140*b* by virtue of this frontward inclination towards the front face 4. The forward or frontward incline of the flange 140 along the second portion 140*b* thereof may result in the first and second surfaces 141, 142 including planar portions extending along each of the side walls 7 and end walls 8 of the electrical box 10 and curved portions connecting each of the non-parallel arranged planar portions at the corners of the flange 140, which is rounded rectangular in the present embodiment. The flange 140 may be inclined at an acute angle relative to the plane defined by the front face 4 of the electrical box 10 and/or the plane defined by where the inner surface 144 engages the outer surface of the electrical box 10. The acute angle may be about 10 degrees, as one non-limiting example.

As can best be seen in FIGS. 10 and 11, the second portion 140*b* of the flange 140 may include a transition region 145 disposed at each end of the first portion 140*a* where the rim 143 first starts to offset away from the plane of the inner surface 144 and towards the front face 4 of the electrical box 10 with the rim 143 arranged at an incline relative to the plane of the inner surface 144 along each of the transition regions 145. The rim 143 continues to extend away from the plane of the inner surface 144 along each of the transition regions 145 until the rim 143 is disposed a maximum offset from the plane of the inner surface 144, which in the disclosed embodiment includes the portions of the rim 143 disposed along each of the curved corner segments, each of the end walls 8, and the side wall 7 disposed opposite the bracket 12. The portion of the rim 143 disposed at the maximum offset from the inner surface 144 of the flange 140 is disposed on a plane that is offset axially to a maximum extent from each of the plane where the inner surface 144 is coupled to the electrical box 10 and the plane of the flange 140 along the first portion 140*a* thereof. The plane defined by the portion of the rim 143 disposed at the maximum offset is also arranged parallel to each of the plane where the inner surface 144 is coupled to the electrical box 10 and the plane of the flange 140 along the first portion 140*a* thereof.

The flange 140 extends outwardly from the periphery of the electrical box 10 (in the vertical and lateral directions as depicted in FIG. 10) by a suitable distance for forming an adequate seal with the inner facing surface 100*a* of the wall structure 100 at positions surrounding an opening 108 formed through the wall structure 100 for the purpose of receiving the front face 4 of the electrical box 10 therethrough. The flange 140 may project about ⅝ of an inch from the outer surface of the corresponding side or end wall 7, 8 to ensure that the seal is established about an entirety of the periphery of the electrical box 10, as one non-limiting example.

Figures 13, 14:
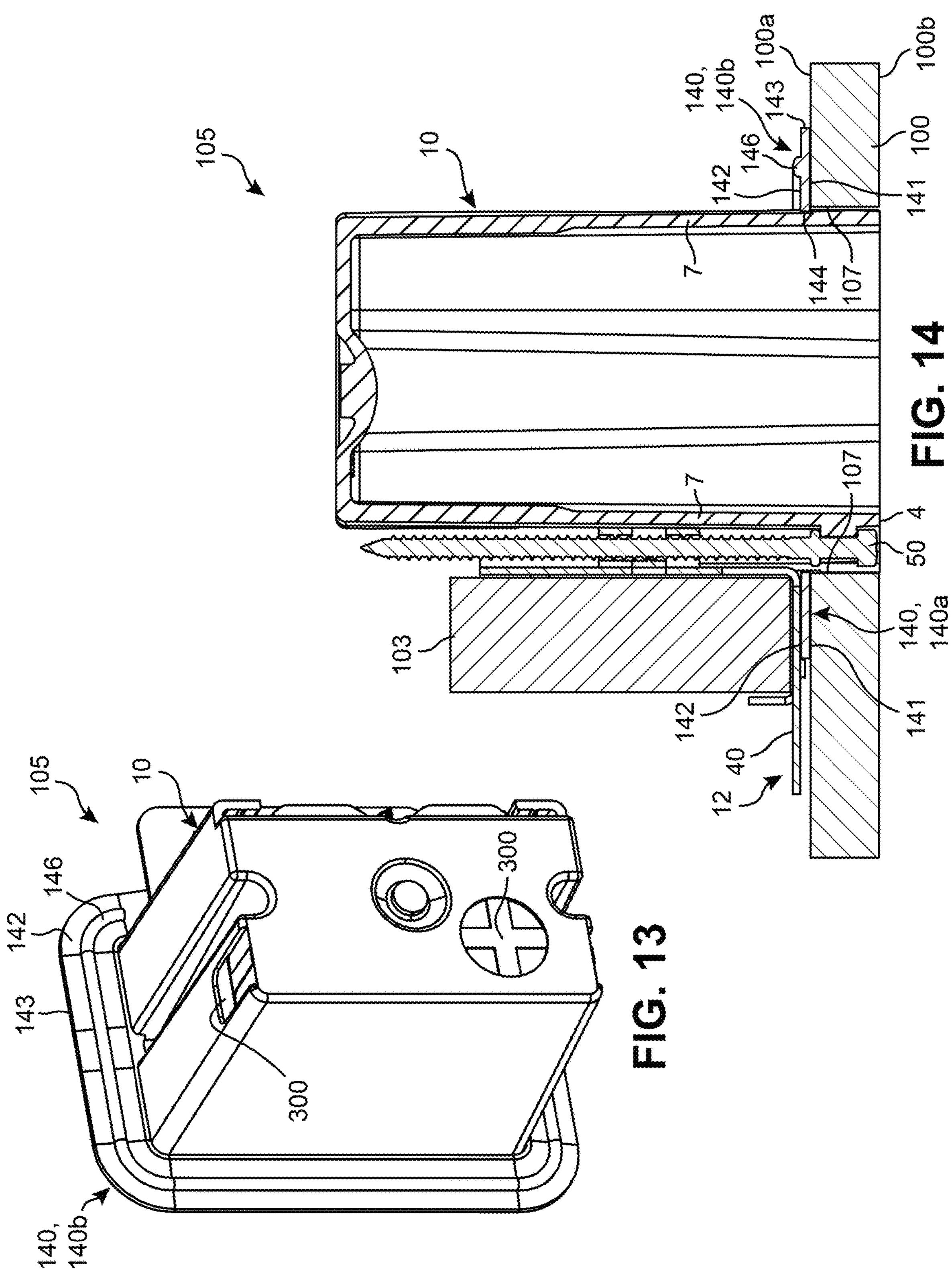
FIG. 13 is a rear perspective view of the adjustable electrical box assembly.
FIG. 14 is a cross-sectional view showing the flanged sealing element of the adjustable electrical box assembly when deformed to a flattened configuration.

As can be seen in FIGS. 11, 13, and 14, the second surface 142 of the flange 140 along the second portion 140*b* thereof may also include a rearwardly projecting rib 146 that extends peripherally around the electrical box 10 at a position between the inner surface 144 and the rim 143. The rib 146 accordingly extends along the three major sides of the electrical box 10 corresponding to the second portion 140*b* of the flange 140. The rib 146 is shown as having a substantially semi-circular cross-section in the present embodiment, but the rib 146 may have alternative cross-sectional shapes without departing from the scope of the present invention, such as a square, triangular, or semi-elliptical cross-sectional shape, as non-limiting alternatives.

As shown in FIG. 14, which shows one example of the electrical box assembly 105 when installed into a representative wall structure 100, the flange 140 is positioned wherein the first surface 141 thereof is facing towards and abutting the inner facing surface 100*a* of the wall structure 100 about a periphery of an opening 107 formed through the wall structure 100 and configured to receive a front portion of the electrical box 10. The abutment of the flange 140 with the inner facing surface 100*a* of the wall structure 100 at positions surrounding the opening 107 provides for the formation of an air-tight seal around a periphery of the electrical box 10 when the electrical box assembly 105 is adjusted to the position shown in FIG. 14.

The inclination of the flange 140 towards the front face 4 of the electrical box 10 along the second portion 140*b* aids in maintaining the air-tight seal around the periphery of the electrical box 10 by means of the resilient flexibility of the material forming the flange 140. Specifically, the installation of the electrical box assembly 105 to a position wherein the front face 4 of the electrical box 10 is flush with outer facing surface 100*b* of the wall structure 100 may include the flange 140 being flexed from the forwardly inclined configuration thereof to a configuration wherein the first surface 141 and the second surface 142 of the flange 140 are arranged substantially parallel to the front face 4 of the electrical box 10. The resiliency of the flange 140 causes the flange 140 to attempt to return to the forwardly inclined pre-installed configuration, which in turn causes the first surface 141 of the flange 140 to apply a force to the inner facing surface 100*a* of the wall structure 100. The resiliency of the flange 140 accordingly biases the flange 140 towards the described sealing configuration in the absence of intervening components, such as additional fasteners or the like.

The rib 146 may be provided along the inclined second portion 140*b* of the flange 140 to strengthen and stiffen the second portion 140*b* against such deformation when the maximum offset portion of the rim 143 is being pressed rearwardly towards the plane of the inner surface 144 in a manner flattening the flange 140 along the second portion 140*b* thereof. This strengthening or stiffening of the flange 140 along the second portion 140*b* thereof (via inclusion of the rib 146) aids the flange 140 in generating an increased resilient force against the inner facing surface 100*a* of the wall structure 100. That is, a greater force is required to deform the flange 140 along the second portion 140*b* thereof as a result of the rib 146 resisting such deformation in comparison to such a flange 140 in the absence of the rib 146, which in turn results in an opposing reaction force of the flange 140 against the inner facing surface 100*a* being increased in comparison to that which would occur absent the inclusion of the rib 146 along the second portion 140*b*.

It should be readily apparent in view of FIG. 14 that the electrical box 10 of the assembly 105 may be adjusted axially relative to each of the surfaces 100*a*, 100*b* of the corresponding wall structure 100 via use of the bracket 12 and the threaded fastener 50 in the same manner as described with regards to the electrical box 10 of the assembly 5, hence description of such a process is omitted herefrom. However, one specific advantage of the electrical box assembly 105 relates to the ability to control the sealing force applied by the flange 140 to the wall structure 100 via the axial adjustability of the electrical box 10 relative to the bracket 12 and the fixed support member 103 to which the bracket 12 is securely coupled. That is, an installer of the electrical box assembly 105 may utilize this axial adjustability to control the amount of deformation that is undergone by the second portion 140*b* of the flange 140 when engaging the wall structure 100 and progressively flattening towards the inner facing surface 100*a* thereof. The axial adjustability also allows the installer to adjust the axial position of the first portion 140*a* of the flange 140 that is devoid of the frontward incline to a position wherein the first portion 140*a* is directly engaging the inner facing surface 100*a* with a force sufficient for preventing the passage of air therearound. The installer may continue to turn the threaded fastener 50 in a direction indicating frontward motion of the electrical box 10 following contact of the flange 140 with the wall structure 100 such that the flange 140 is further compressed or otherwise deformed against the inner facing surface 100*a*, thereby increasing the resulting scaling force. That is, an axial adjustment of the electrical box assembly 105 in the frontward direction of the electrical box 10 causes the flange 140 to eventually sealingly engage the inner facing surface 100*a* of the wall structure 100, and then continued frontward adjustment progressively increases the sealing force generated by such sealing engagement. In contrast, an adjustment of the electrical box 10 in the rearward direction can cause the disengagement of the flange 140 from the inner facing surface 100*a*, or a lessening of the sealing force present therebetween, depending on the instantaneous circumstances.

Figure 15:
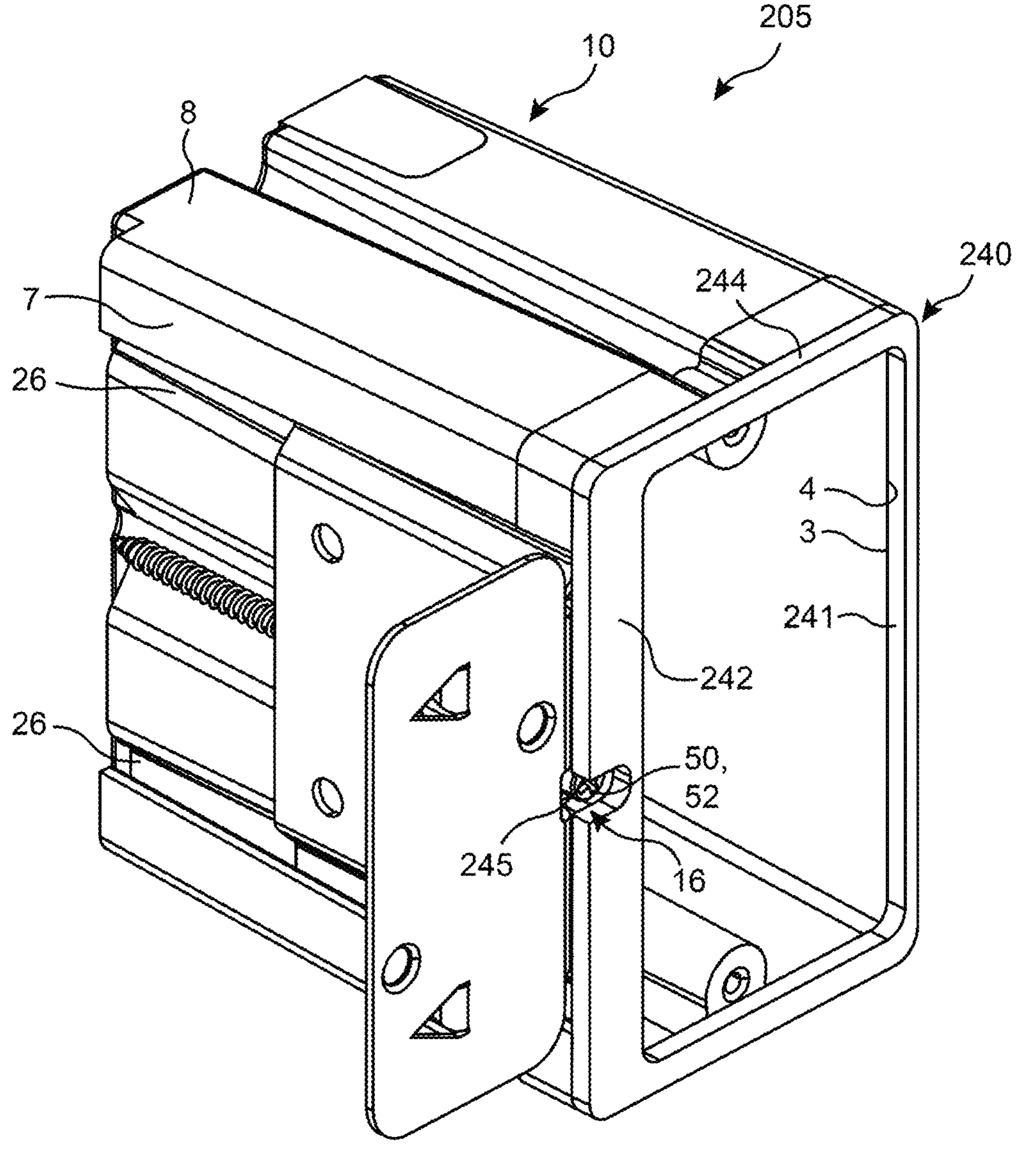
FIG. 15 is a front perspective view of an adjustable electrical box assembly having a face sealing element according to another embodiment of the present invention.
Figure 16:
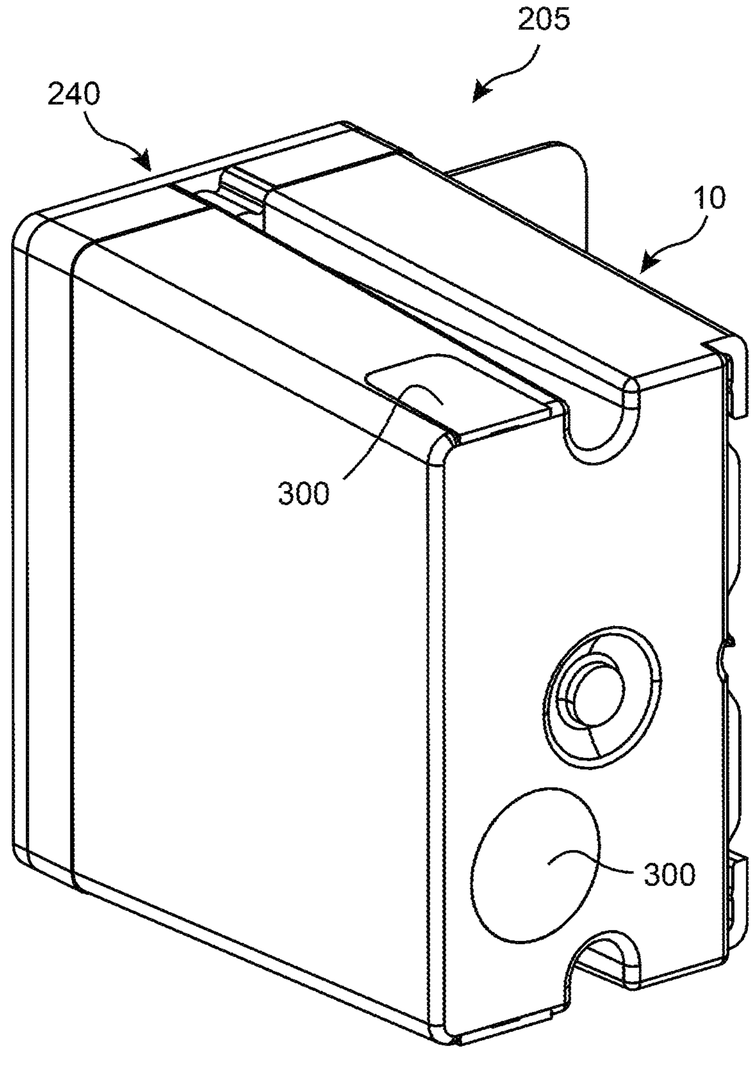
FIG. 16 is a rear perspective view of the adjustable electrical box assembly of FIG. 15.

Referring now to FIGS. 15 and 16, an electrical box assembly 205 according to yet another embodiment of the present invention is disclosed. The electrical box assembly 205 is similar to the electrical box assembly 105 of FIGS. 10-14, but includes a sealing element 240 thereof disposed directly at the front face 4 of the electrical box 10, as opposed to being disposed along the outer circumferential surface of the electrical box 10 as formed by the rearwardly extending walls 7, 8. The sealing element 240 is once again provided for establishing a vapor barrier via engagement of the sealing element 240 to an inner facing surface of a corresponding wall structure during an adjustment of the electrical box 10 to a desired axial position relative to the wall structure.

The sealing element 240 is presented in FIGS. 15 and 16 as a face cover 240 disposed along the front face 4 of the electrical box 10. The face cover 240 is disposed on the front face 4 to extend around a periphery of the front opening 3 leading into the hollow interior of the electrical box 10, thereby causing the face cover 240 to include a corresponding access opening 241 formed therein in alignment with the front opening 3 of the electrical box 10 and leading into the hollow interior of the electrical box 10. The face cover 240 of the present embodiment accordingly includes a substantially rectangular peripheral shape in accordance with the rectangular peripheral shape of the front face 4 of the electrical box 10. The face cover 240 may be configured to cover an entirety of the front face 4 of the electrical box 10 or only portions thereof, so long as the front opening 3 is circumscribed by the face cover 240. The face cover 240 may also extend over void features of the electrical box 10 extending to the front face 4 thereof, such as covering each of the bracket-receiving openings 26 extending to the front face 4 along an outer surface of the one of the side walls 7 having the bracket 12 installed therein. The face cover 240 may include an adjustment opening 245 formed therein, wherein the adjustment opening 245 refers to any void of the face cover 240 providing access to an adjustment mechanism, such as the threaded fastener 50, for adjusting the axial position of the electrical box 10 relative to the bracket 12. The adjustment opening 245 is depicted in FIG. 15 as a laterally extending indentation formed in an edge of the face cover 240 for revealing the channel 16 and the head 52 of the threaded fastener 50, thereby allowing for access to the adjustment feature of the electrical box assembly 205.

The face cover 240 may be formed to include a perimeter 244 thereof that matches a perimeter of the front face 4 along at least some segments thereof, thereby resulting in the perimeter 244 of the face cover 240 having one or more segments extending continuously in the axial direction from the outer surface of the electrical box 10 as formed by the outer surface of a corresponding one of the rearwardly extending walls 7, 8 thereof. However, the perimeter 244 of the face cover 240 may alternatively be indented inwardly relative to the front face 4 along one or more segments thereof and/or may be expanded outwardly beyond the front face 4 along one or more segments thereof, as desired. In some embodiments, the perimeter 244 of the face cover 240 extends outwardly beyond the perimeter of the front face 4 and may also extend axially over at a portion of the outer circumferential surface of the electrical box 10 as formed by the outer surfaces of the rearwardly extending walls 7, 8 thereof. Such a sealing arrangement may be utilized in extending the sealing element 240 around the outer circumferential surface of the electrical box 10 when attempting to establish a seal between the outer circumferential surface with an inner surface of the wall structure defining an opening for receiving the electrical box 10 therein, such as the opening 107 formed through the wall structure 100 of FIG. 14. The face cover 240 may include a substantially uniform thickness thereacross with the thickness dimension corresponding to the axial direction of the electrical box 10. The face cover 240 may also include an outer facing surface 242 that is planar and arranged parallel to the front face 4 at a distance therefrom corresponding to the thickness dimension of the face cover 240.

The face cover 240 may be formed from any of the materials described as being suitable in forming the flange 140. The face cover 240 is accordingly resiliently flexible in the same manner as the flange 140, as can thus be elastically deformed in forming a sealing force with a corresponding surface of a wall structure. The face cover 240 may be compressed in the axial direction of the electrical box 10 in forming such a sealing force around the periphery of the front opening 3 into the electrical box 10.

The electrical box assembly 205 may be utilized in situations wherein the front face 4 of the electrical box 10 is installed to contact an inner facing surface of a corresponding wall structure, such as contacting the inner facing surface 100*a* of the wall structure 100 of FIG. 14 at positions surrounding the opening 107 formed through the wall structure 100. In such a situation, the opening 107 formed through the wall structure 100 may be sized for alignment with the front opening 3 of the electrical box 10 and the access opening 241 of the face cover 240 to position the face cover 240 to engage the inner facing surface 100*a* around the perimeter of the opening 107.

In use, the electrical box 10 may be adjusted axially relative to the bracket 12 via use of the corresponding adjustment device (threaded fastener 50) such that the outer facing surface 242 of the face cover 240 approaches the inner facing surface of the corresponding wall structure (not shown). The electrical box 10 may be moved axially towards the wall structure until the face cover 240 has sealingly engaged the inner facing surface and formed a sufficient seal. As noted above in describing the electrical box assembly 105, the installer of the electrical box assembly 205 may attempt to over-adjust the frontward position of the electrical box 10 to press the face cover 240 against the inner facing surface of the wall structure in order to compress the face cover 240 to a desired extent, thereby increasing the sealing force applied by the face cover 240 when attempting to resiliently spring back against the inner facing surface upon compression thereof. The seal formed by the face cover 240 may also be lessened by adjusting the position of the electrical box 10 away from the inner facing surface of the wall structure.

Each of the electrical box assemblies 105, 205 accordingly includes the use of a scaling element 140, 240 at or adjacent the front face 4 of the electrical box 10 that is able to have a sealing effect thereof adjusted via the adjustment of the axial position of the electrical box 10 relative to the wall structure engaging the sealing element 140, 240. In each instance, the installer can move the electrical box 10 in a frontward axial direction corresponding to the establishment of a perimeter seal around the front opening 3 of the electrical box 10 and then a progressive increase in the corresponding sealing force as the sealing element 140, 240 is further elastically deformed.

Each of the electrical box assemblies 105, 205 may include the corresponding sealing element 140, 240 thereof overmolded onto the electrical box 10 following the formation of the electrical box 10 itself. That is, the electrical box 10 may be formed using a first material in a first molding process, and the electrical box 10 resulting from the first molding process may then be positioned relative to one or more molds for forming the resiliently flexible sealing element 140, 240 on the electrical box 10 at each of the respectively disclosed positions thereon.

With reference now to FIGS. 13 and 16, each of the electrical box assemblies 105, 205 may include the electrical box 10 having one or more wire receiving features 300 formed within one of the walls 6, 7, 8 thereof, wherein such wire receiving features 300 may refer to knockouts 300 provided in the walls 6, 7, 8 for the passage of wires into or out of the hollow interior of the electrical box 10. Such knockouts 300 may be provided as resiliently flexible portions of the walls 6, 7, 8 of the electrical box 10 which may be pierced, separated, or otherwise penetrated for gaining access to the interior of the electrical box 10. Such knockouts 300 may be formed from the same resiliently flexible material utilized in forming the corresponding sealing element 140, 240, hence each of the knockouts 300 may be formed in the same manufacturing process as the corresponding sealing element 140, 240. More specifically, where the 2-step overmolding described above is utilized, the electrical box 10 may be formed in the first molding process and the corresponding sealing element 140, 240 and all such knockouts 300 may be overmolded onto the electrical box 10 during the second molding process. The manufacturing of the electrical box assemblies 105, 205 can thus be improved via the formation of multiple components in a common manufacturing step.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electrical box assembly for installation in a wall structure having a support member, the electrical box assembly comprising:

an electrical box having a front face with a front opening formed therein, the front opening leading into an interior of the electrical box, a bracket slidably coupled to an outer circumferential surface of the electrical box, the bracket configured to be securely coupled to the support member of the wall structure such that the bracket remains stationary relative to the support member and wall structure when securely coupled thereto;

a sealing element coupled directly to the electrical box along an interface between the sealing element and the electrical box disposed at or adjacent the front face of the electrical box such that the sealing element moves in unison with the electrical box at the interface therebetween, the sealing element configured to form a seal with an inner facing surface of the wall structure when the sealing element is engaged therewith; and an adjustment mechanism configured to selectively adjust a position of the electrical box and the sealing element coupled directly thereto relative to the bracket with respect to an axial direction of the electrical box, wherein a sealing force present at the seal between the sealing element and the inner facing surface of the wall structure is adjustable via the adjustment of the position of the electrical box and the sealing element coupled directly thereto relative to the bracket with respect to the axial direction of the electrical box, wherein the adjustment of the sealing force present at the seal is caused by varying a degree of flexure or compression of the sealing element as caused by movement of the interface between the sealing element and the electrical box towards or away from the inner facing surface of the wall structure during the adjustment of the position of the electrical box and the sealing element coupled directly thereto relative to the bracket with respect to the axial direction of the electrical box.

2. The electrical box assembly of claim 1, wherein the sealing element is formed from a resiliently flexible material.

3. The electrical box assembly of claim 2, wherein the sealing element is formed from an elastomeric material.

4. The electrical box assembly of claim 2, wherein the sealing element is formed from thermoplastic copolyester.

5. The electrical box assembly of claim 2, wherein the electrical box is formed from a rigid material.

6. The electrical box assembly of claim 5, wherein the electrical box is formed from fiberglass-reinforced polyester.

7. The electrical box assembly of claim 1, wherein the adjustment mechanism is a threaded fastener coupled to the electrical box and threadingly engaging the bracket in a manner wherein rotation of the threaded fastener causes the position of the electrical box and the sealing element coupled directly thereto to be adjusted relative to the bracket with respect to the axial direction of the electrical box.

8. The electrical box assembly of claim 1, wherein the sealing element is an outwardly extending flange and the interface between the sealing element and the electrical box is disposed on the outer circumferential surface of the electrical box adjacent the front face thereof.

9. The electrical box assembly of claim 8, wherein an inner surface of the flange forming the interface between the sealing element and the electrical box is disposed on the outer circumferential surface and is spaced apart from the front face by an axial distance along the outer circumferential surface, the axial distance corresponding to a thickness of the wall structure where the sealing element engages the inner facing surface of the wall structure.

10. The electrical box assembly of claim 8, wherein an inclined portion of the flange is inclined towards the front face of the electrical box with respect to the axial direction of the electrical box as the inclined portion of the flange extends outwardly away from the outer circumferential surface of the electrical box.

11. The electrical box assembly of claim 10, wherein the inclined portion of the flange includes a rim of the flange being offset from an inner surface of the flange forming the interface between the sealing element and the electrical box disposed on the outer circumferential surface of the electrical box with respect to the axial direction of the electrical box.

12. The electrical box assembly of claim 10, wherein the sealing force present between the inclined portion of the flange and the inner facing surface of the wall structure is increased as the inclined portion of the flange is increasingly flexed and flattened towards a plane arranged perpendicular to the axial direction of the electrical box during engagement of the inclined portion of the flange with the inner facing surface of the wall structure.

13. The electrical box assembly of claim 10, wherein a planar portion of the flange is arranged along a plane perpendicular to the axial direction of the electrical box, the planar portion of the flange aligned with the bracket with respect to the axial direction of the electrical box.

14. The electrical box assembly of claim 13, wherein the inclined portion of the flange extends along three sides of the outer circumferential surface of the electrical box and the planar portion of the flange extends along one side of the outer circumferential surface having the bracket slidably coupled thereto.

15. The electrical box assembly of claim 13, wherein the planar portion of the flange includes a fastener opening formed therethrough, and wherein the fastener opening of the flange is aligned with an aperture formed through the bracket with respect to the axial direction of the electrical box.

16. The electrical box assembly of claim 1, wherein the sealing element is a face cover with the interface between the sealing element and the electrical box disposed on the front face of the electrical box and with the face cover circumscribing the front opening of the electrical box.

17. The electrical box assembly of claim 16, wherein the face cover includes an adjustment opening formed therein for providing access to the adjustment mechanism by way of the front face of the electrical box.

18. The electrical box assembly of claim 16, wherein the sealing force present between the face cover and the inner facing surface of the wall structure is increased as the face cover is increasingly compressed against the inner facing surface of the wall structure via movement of the electrical box towards the inner facing surface following engagement of the face cover therewith.

19. The electrical box assembly of claim 1, wherein the sealing element is overmolded onto the electrical box.

20. The electrical box assembly of claim 19, wherein the electrical box further includes at least one knockout formed from a same material as the sealing element, wherein the at least one knockout is overmolded onto the electrical box during the overmolding of the sealing element thereto.

* * * * *